(12) United States Patent
Pinto

(10) Patent No.: US 8,996,247 B2
(45) Date of Patent: Mar. 31, 2015

(54) AUDIO/VIDEO ELECTRONIC EQUIPMENT, SUCH AS A MULTIMEDIA CAR RADIO, INSTALLABLE IN AN AUTOMOTIVE VEHICLE

(71) Applicant: Parrot, Paris (FR)

(72) Inventor: Guillaume Pinto, Paris (FR)

(73) Assignee: Parrot, Paris (FR)

( * ) Notice: Subject to any disclaimer, the term of this patent is extended or adjusted under 35 U.S.C. 154(b) by 14 days.

(21) Appl. No.: 13/961,427

(22) Filed: Aug. 7, 2013

(65) Prior Publication Data

US 2014/0082342 A1     Mar. 20, 2014

(30) Foreign Application Priority Data

Sep. 18, 2012  (FR) ..................... 12 58758

(51) Int. Cl.
  *B60N 3/00*      (2006.01)
  *G06F 9/44*      (2006.01)
  *H04B 1/08*      (2006.01)
  *G06F 19/00*     (2011.01)
(52) U.S. Cl.
  CPC .............. *G06F 9/4406* (2013.01); *H04B 1/082* (2013.01)

USPC ..................................... 701/36; 701/54; 713/2
(58) Field of Classification Search
  USPC ........................................... 701/36, 54; 713/2
  See application file for complete search history.

(56) References Cited

U.S. PATENT DOCUMENTS

| 4,369,398 | A * | 1/1983 | Lowry, Sr. ..................... 318/114 |
| 2009/0189373 | A1 | 7/2009 | Schramm et al. |
| 2009/0262045 | A1 | 10/2009 | Nakano et al. |
| 2012/0232780 | A1 * | 9/2012 | Delson et al. ................. 701/400 |

FOREIGN PATENT DOCUMENTS

WO       2011062583 A1     5/2011

* cited by examiner

*Primary Examiner* — Tan Q Nguyen
(74) *Attorney, Agent, or Firm* — Haverstock & Owens LLP

(57) ABSTRACT

The equipment comprises a digital processor implementing an operating system requiring a previous boot before the equipment is in an operational state. A start module is operable, when the device is initially in a power-off state, for: producing a triggering signal upon detection (32) of a vibration by a sensor incorporated in the equipment, and activating (34) the processing means so as to initiate the boot of the operating system, but without activating the lighting means of a front display of the equipment, and finally activating these lighting means upon reception (36) of a vehicle start signal.

4 Claims, 2 Drawing Sheets

AUDIO/VIDEO ELECTRONIC EQUIPMENT, SUCH AS A MULTIMEDIA CAR RADIO, INSTALLABLE IN AN AUTOMOTIVE VEHICLE

The invention relates to an audio/video electronic equipment, such as a multimedia car radio, installable in an automotive vehicle.

The application to the car radios, although being particularly advantageous, is however not limitative of the invention that, as will be understood, may be applied to very numerous types of other electronic devices usable on board an automotive vehicle.

The recent generations of such equipments implement very numerous functions, integrating in a same device hands-free telephony functions and multimedia functions with coupling to external devices or memory supports and GPS satellite positioning functions. The more recent equipments also integrate elements of mobile connectivity allowing in particular the access to Internet for messaging, streaming music files transfer services, etc.

The devices of the Parrot Asteroid (registered trademark) family, marketed by Parrot SA, Paris, France, are typical examples of such equipments.

The implementation of such multiple functionalities require a microcontroller piloted by an operating system (OS) that may in particular be an OS designed for mobile terminals such as Android, which is an open source software including all the utility programs required for implementing a mobile terminal, integrating existing or downloadable applications, interact with the geolocation of the terminal, etc.

The term "operating system" has to be understood here within the precise meaning that is given to it in computer science, i.e. a high-level computer control software that can be interfaced with various external software applications. The OS manages the allocation of the memory resources between these software applications, the access of these latter to the peripherals, the sequencing of their execution, the handling of files, etc.

An OS is to be distinguished from the specific on-board firmwares, which are proper to the microcontrollers used in particular to multiplex and pilot directly the on-board equipments of an automotive vehicle, as disclosed for example in the U.S. 2009/0189373 A1, which implements no OS nor distinct software applications.

A drawback peculiar to the OSs lies in particular in the fact that they are not incorporated in the microcontroller, but stored in an external memory. For that reason, at the equipment power-up, the OS has to be read and loaded in the random access memory, then a number of previous starting or boot operations and verifications have to be executed, which, in the case of Android, may typically require 20 to 30 seconds before the equipment becomes fully operational following the power-up.

This waiting time is not too annoying in the case of a telephone or a tablet, which are generally not often reset and whose battery is often recharged, generally at least once a day. It is therefore possible to leave permanently the OS in the operational state without particular drawback—except that after several days more or less erratic operations may occur, which imposes restarting the device from time to time by power off/power on, so as to reset the device and its system.

But in the case of an equipment on board an automotive vehicle, it is not conceivable to leave the equipment permanently powered on: unlike a personal object such as a portable phone, a vehicle may indeed remain unused for very long periods, and the consumption of the equipment at the power-on state (typically a few tens or hundreds of milliamps) might finally discharge the battery of the vehicle.

It is therefore indispensable to power-off the equipment when the vehicle is not used. But, as a consequence, when the user picks up his vehicle, the equipment's OS has to be rebooted, so that the equipment is not immediately available—unlike for example a conventional car radio, which the driver may power up as soon as he sits down in his vehicle.

Paradoxically, for the user, having a sophisticated equipment translates into a lesser convenience of use due to this waiting time, comparable to that of the old tube devices that have precede the transistorized devices.

One of the objects of the invention is to remedy this difficulty, by reducing the waiting time required so that, when the driver sits down in his vehicle, the equipment is fully operational after the OS reboot.

A particular constraint is in that such an equipment may be installed as an "aftermarket equipment", i.e. it may be mounted in any vehicle only with the conventional connections for on-board power supply, link to the contact key, etc., without particular connection to the on-board electronics of the vehicle (necessarily specific to that latter) nor to any external detector such door opening detector, remote-control operation detector, driver or passenger presence detector using a seat-incorporated pressure sensor (as in the U.S. 2009/0262045 A1), etc., wherein such devices can be present or not, and when present, are not standardized.

Moreover, it is known that it is advantageous to reboot from time to time the equipment's OS so as to avoid erratic behaviors of the device it pilots.

In a vehicle, this reboot is normally operated, on a systematic basis, at each operation of the contact key of the vehicle. But in case of short stops (the driver stopping to post a letter, to load a packet, etc.), this systematic restart becomes a drawback, because it will each time be necessary to wait for the full duration of the OS reboot before the equipment comes back to its prior, operational state.

One of the objects of the invention is also to remedy this drawback.

To achieve the above-mentioned objects, the invention proposes an electronic equipment able to be installed in an automotive vehicle, such equipment being of the general type disclosed by the above-mentioned U.S. 2009/0189373 A1, i.e. comprising: digital processing means, capable of being in a power-off sate or in an operational state; a vehicle-start-signal detection input; a front display provided with lighting means; and a start module operable for controlling the lighting means.

The invention relates to the case where the digital processing means implement an operating system that requires a previous boot time to switch from the power-off state to the operating state.

Characteristically, the equipment thus comprises a sensor operable for producing a triggering signal upon detection of a vibration. The start module is operable for, upon reception of the triggering signal and from a power-off state: i) in a first time, activating the digital processing means so as to initiate the boot of the operating system, but without activating the lighting means, and ii) in a second time, upon reception of a vehicle start signal, activating the lighting means.

The vibration sensor is preferably incorporated in the equipment casing.

Very advantageously, the start module is further operable for, after reception of a triggering signal and in the absence of subsequent reception of a vehicle start signal for a predetermined time, forcing the switching of the processing means back to the power-off state.

The equipment may in particular comprise the start module and an operational module including the processing means, the display and the lighting means, as well as circuits for the analog and digital processing of the audio/video signals. At the power-off state, the start module is the only one to be powered, the operational module being not powered. The start module then switches on the operational module upon reception of the triggering signal, so as to produce a systematic reboot of the operating system at each transition from the power-off state to the operational state.

An example of implementation of the device of the invention will now be described, with reference to the appended drawings in which same reference numbers designate identical or functionally similar elements through-out the figures.

FIG. 1 schematically shows the configuration of the equipment according to the invention in an automotive vehicle.

Figure 1:
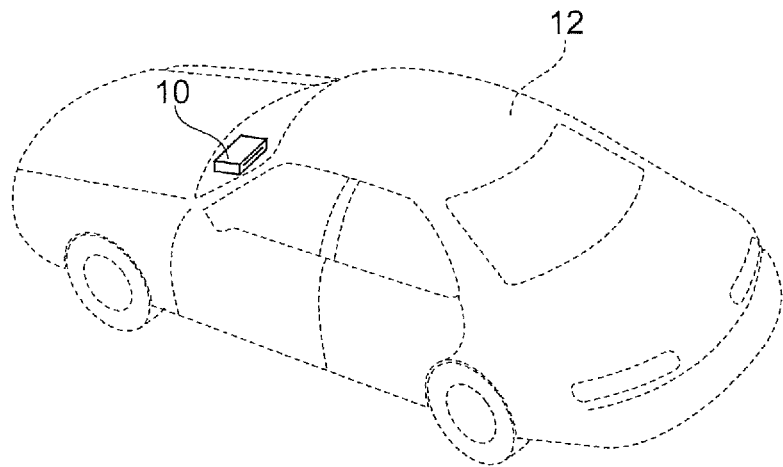
Figure 2:
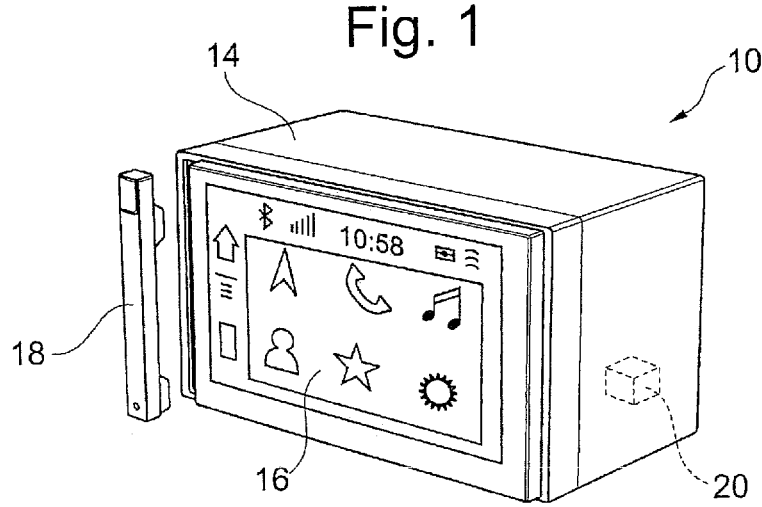
FIG. 2 is a perspective external view of exemplary equipment to which the invention can be applied.

In FIGS. 1 and 2, the reference 10 generally denotes an audio/video electronic equipment such as a multimedia car radio installed in the dashboard of a vehicle 12.

FIG. 2 illustrates more precisely, by way of example, the external configuration corresponding to the Parrot Asteroid 2DIN model of Parrot SA, Paris, France, which is in the form of a block of standard size able to be integrated in the dashboard of an automotive vehicle, herein a "double DIN" standard block (in reference to the standard DIN75490/ISO7736). A box 14 encloses the various electronic elements, and at the front side, a touch screen display 16 of great size allows an easy control of the various functions, as well as the display of lists, of a GPS map, etc. The casing 14 receives a removable front panel 18 of reduced size in the form of a vertical elongated strip laterally attached to the screen 16 and provided with a "On/Off" button for powering-on the equipment by pressing this button after the front panel has been mounted on the casing. This removable front panel 18, which may comprise other elements such as light indicators, etc., controlled by the voltages and signals of the car radio, plays the role of an antitheft system for the equipment.

Characteristically of the invention, the equipment 10 is provided with a vibration detector 20, preferably incorporated to the casing 14 of the equipment.

This sensor is for example a micro-bead sensor such as that described in the U.S. Pat. No. 7,421,793 B2, which requires for its operation a very low permanent current, of the order of 50 nA, and which is sensitive to the occurrence of vibrations without particular directivity. This example is of course not limitative, and other types of sensors may of course be used, provided that they can detect the occurrence of a vibration resulting from the opening of a door, or even simply from the remote unlocking of the doors by operation of a remote control.

Figure 3:
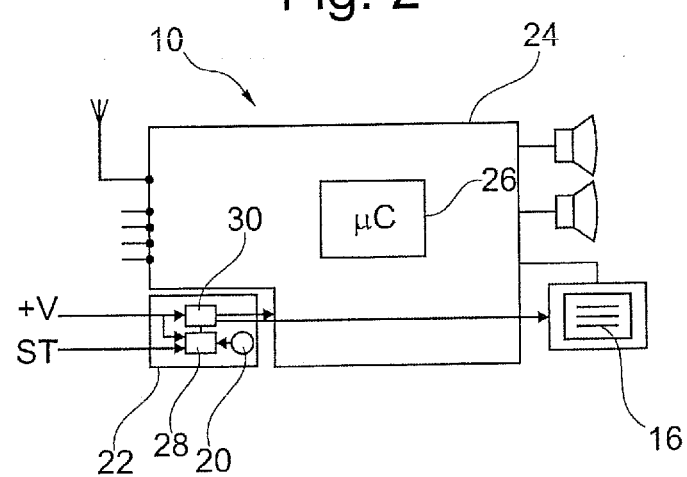
FIG. 3 is a scheme showing the different operational blocks involved in the implementation of the invention.

As illustrated in FIG. 3, the vibration sensor 20 is part of a circuit forming a start module 22, connected to the permanent supply +V of the on-board electric network of the vehicle as well as to the contact key (start input ST allowing detecting that the driver has started the engine after sitting down at the driver stand).

The start module 22 is permanently powered but, as mentioned hereinabove, the very low power consumption of the vibration sensor results in that this module consumes in the standby state only a very low quantity, of the order of a few microwatts, in any case much lower than the power consumption of the various circuits of a vehicle usually staying in standby state, even at the complete stop of the vehicle.

This start module is interfaced with the remaining of the circuits of the equipment, grouped in an operational module 24 that is not powered when the vehicle is stopped or as long as the power-on switch of the equipment has not been actuated. This operational module 24 includes a microcontroller with its operating system (OS), and is connected to the various peripherals such as the display 16, the receiving antenna of the vehicle, the loudspeakers, etc.

The start module 22 comprises a circuit 28 coupled to the vibration sensor 20 and receiving as an input the ST signal indicating the starting of the vehicle. This circuit 28 pilots a circuit 30 for controlling the power supply of the operational module and of the display 16 according to a process that will now be described with reference to FIG. 4.

Figure 4:
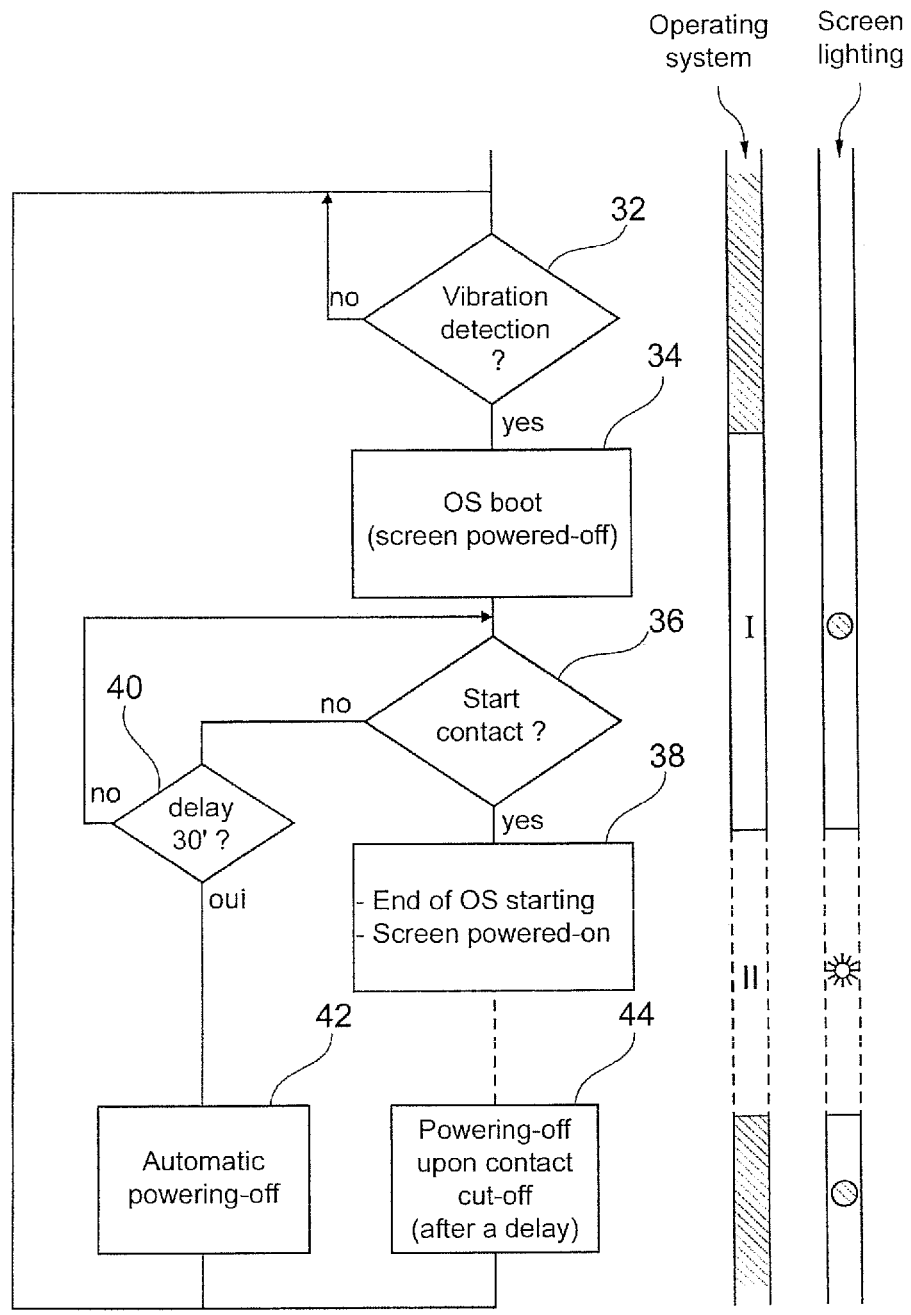
FIG. 4 is an flow chart explaining the successive steps of the operation of the device of the invention.

FIG. 4 illustrates a flow chart of the various steps of operation of the device of the invention, with, on the right, the indication of the state of the microcontroller's OS (hatching: powered-off; I: boot phase, II: operating system in operational state) as well as the state of the screen lighting (on or off).

When the user opens his door or remotely unlocks the doors, a vibration is produced, which is detected by the sensor 20 (step 32). This detection has for effect to make the equipment start and thus to initiate the OS boot as a background task (step 34), but however without activating the lighting means of the screen 16. This boot of the OS may be initiated even if the antitheft front panel of the car radio has not yet been installed.

If the user starts the car (step 36), then the screen is powered on and the OS boot is stopped (step 38), but within a delay that will appear to the user very shorter than if he had just powered on the equipment, because the time the user enters into the vehicle, sits down, installs himself, etc., the major part of the OS boot time will have still elapsed.

Therefore, the waiting time for the equipment to be available to play music, to activate the GPS functions, etc., will be highly reduced, typically to only a few seconds, instead of about thirty seconds, in the case of the boot of an OS such as Android. This advantage is provided by the choice of a vibration sensor, activated without delay as soon as the door is unlocked or open, thus far before the driver sits down on his seat—an advantage that would not be offered by the use of a presence sensor such as the seat-incorporated pressure sensor described in the U.S. 2009/0262045 A1 (supposing further that the vehicle is equipped with such a sensor).

It may arrive that, at step 36, no contact is detected, as in the case of a vibration resulting from the passage of a heavy vehicle near the parked vehicle, or due to movements of air.

To respond to that situation, an additional mechanism is implemented: if during 30 minutes (step 40) after the detection of the vibration the car has not been started, i.e. no contact key signal ST has been detected, then the equipment automatically powers off, by itself (step 42), and waits for the next vibration (return to step 32).

It will be noted that, in this case, as the car has not been started, the screen is always stayed powered off, and that the background powering on of the equipment has not been visible from the outside.

Finally, in the case where the powering off of the device is a voluntary powering off by contact cut-off (step 44), the start module does not power off immediately the equipment, but just power off the lighting means of the display 16.

It is only after a predetermined time has elapsed, for example 30 minutes, that the operational module will be totally stopped. This allows avoiding the equipment powering-off/on operations, inducing successive reboots of the OS, in situations where the driver stops his car for only a short time. This mechanism allows the equipment to be immediately operational, without delay, as soon as the driver comes back in his vehicle and starts it again.

On the other hand, for a long stop, the equipment will be finally totally deactivated, which allows avoiding any excessive power consumption that would rapidly discharge the battery of the stopped vehicle. Moreover, this ensures that the OS will be systematically rebooted, with full resetting of the equipment at each use.

The invention claimed is:

1. An audio/video electronic equipment (10), able to be installed in an automotive vehicle (12), said equipment comprising:
   a microcontroller (26), capable of being in a power-off state or an operating state;
   a vehicle-start-signal detection input (ST);
   a front display (16) provided with a lighting module to provide light to the front display; and
   a start module (22) operable for controlling the lighting module, characterized in that:
   the microcontroller (26) includes an operating system;
   the operating system requires a previous boot time to switch from the power-off state to the operating state;
   the equipment further comprises a sensor (20) operable for producing a triggering signal upon detection (32) of a vibration; and
   the start module (22) is operable for, upon reception of the triggering signal and from a power-off state:
   i) in a first time (I), activating (34) the microcontroller so as to initiate the boot of the operating system, but without activating the lighting module, and
   ii) in a second time (II), upon reception (36) of a vehicle start signal, activating the lighting module (38).

2. The equipment of claim 1, wherein the start module is further operable for, after reception of the triggering signal and in the absence (40) of subsequent reception of the vehicle start signal during a predetermined time, forcing (42) the switching of the microcontroller back to the power-off state.

3. The equipment of claim 1, wherein:
   the equipment comprises:
      said start module (22), and
      an operational module (24) including the microcontroller (26), the display (16) and the lighting module, as well as circuits for the analog and digital processing of the audio/video signals,
   at the power-off state, the start module is the only one to be powered, the operational module being not powered, and
   the start module is further operable for switching on the operational module upon reception of the triggering signal,
to produce a systematic reboot of the operating system at each transition from the power-off state to the operational state.

4. The equipment of claim 1, wherein the vibration sensor (20) is incorporated to the casing (14) of the equipment.

* * * * *